United States Patent
Sharma et al.

(10) Patent No.: US 11,308,069 B2
(45) Date of Patent: Apr. 19, 2022

(54) DATA CONFIGURATION, MANAGEMENT, AND TESTING

(71) Applicant: Accenture Global Solutions Limited, Dublin (IE)

(72) Inventors: Pragya Sharma, Mumbai (IN); Bhavin Prafulchandra Mehta, Mumbai (IN); Santanu Dutta, Bangalore (IN); Rajesh Thimmappayya Katta, Bangalore (IN); Manish Bachhania, Mumbai (IN); Nilesh Gupta, Rajasthan (IN); Subha Pattanayak, West Bengal (IN); Vijeth Srinivas Hegde, Bangalore (IN); Vijayakumar Thandavakrishnan, Chennai (IN); Ritu Pramod Dalmia, Maharashtra (IN)

(73) Assignee: Accenture Global Solutions Limited, Dublin (IE)

( * ) Notice: Subject to any disclaimer, the term of this patent is extended or adjusted under 35 U.S.C. 154(b) by 195 days.

(21) Appl. No.: 16/744,519

(22) Filed: Jan. 16, 2020

(65) Prior Publication Data
US 2021/0224245 A1    Jul. 22, 2021

(51) Int. Cl.
*G06F 15/16* (2006.01)
*G06F 16/23* (2019.01)
*G06F 16/2457* (2019.01)
*G06N 20/00* (2019.01)
*G06F 9/48* (2006.01)
*G06F 16/21* (2019.01)

(52) U.S. Cl.
CPC ........ *G06F 16/2358* (2019.01); *G06F 9/4881* (2013.01); *G06F 16/211* (2019.01); *G06F 16/24573* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 2015/0269212 A1* | 9/2015 | Kramer | G06F 16/2358 707/687 |
| 2016/0335163 A1* | 11/2016 | Teodorescu | G06F 16/2455 |
| 2017/0052814 A1* | 2/2017 | Aguiar | G06F 9/5083 |
| 2019/0265982 A1* | 8/2019 | Mickelsson | H04L 41/0213 |
| 2019/0325046 A1* | 10/2019 | Novik | G06F 16/213 |
| 2020/0341971 A1* | 10/2020 | Krishnaswamy | G06F 16/176 |

* cited by examiner

*Primary Examiner* — Alex Gofman
(74) *Attorney, Agent, or Firm* — Harrity & Harrity, LLP

(57) ABSTRACT

A data management platform may receive an environment configuration for a data environment to be implemented in a data structure, wherein the environment configuration includes requirements of an application. The data management platform may configure, based on the environment configuration, the data environment, to generate a configured data environment. The data management platform may deploy the configured data environment in the data structure. The data management platform may perform one or more tests on data stored in the configured data environment in the data structure to generate one or more test results based on performing the one or more tests on the data. The data management platform may update, based on the one or more test results, the configured data environment, to generate an updated configured data environment, wherein the updated configured data environment meets the requirements of the application.

20 Claims, 10 Drawing Sheets

DATA CONFIGURATION, MANAGEMENT, AND TESTING

BACKGROUND

Data analytics involves using data to discover useful information, inform conclusions, and/or support decision-making. For example, an entity may collect data and use data analytics to monitor one or more functions of the entity, make decisions, and/or the like. Data management involves collecting, validating, storing, testing, and/or the like data to permit the entity to access the data, for example, to perform data analytics.

SUMMARY

According to some implementations, a method may include receiving, by a device, an environment configuration for a data environment to be implemented in a data structure, wherein the environment configuration includes requirements of an application; configuring, by the device and based on the environment configuration, the data environment, to generate a configured data environment; deploying, by the device, the configured data environment in the data structure; performing, by the device, one or more tests on data stored in the configured data environment in the data structure to generate one or more test results based on performing the one or more tests on the data; updating, by the device and based on the one or more test results, the configured data environment, to generate an updated configured data environment, wherein the updated configured data environment meets the requirements of the application; and performing, by the device, metadata validation on the data stored in the updated configured data environment in the data structure, wherein performing the metadata validation includes: determining whether a metadata schema of a source which provided the data corresponds to a metadata schema of the application; determining whether the metadata schema of the source which provided the data corresponds to a metadata schema of the data in the updated configured data environment in the data structure; and determining whether the metadata schema of the data in the updated configured data environment in the data structure corresponds to the metadata schema of the application; and performing, based on the metadata validation, at least one of: updating a metadata field in a metadata validation log, stopping the metadata validation, or updating the metadata validation log with a failure entry.

According to some implementations, a non-transitory computer-readable medium may store one or more instructions. The one or more instructions, when executed by one or more processors, may cause the one or more processors to: receive an environment configuration for a data environment to be implemented in a data structure, wherein the environment configuration includes requirements of a plurality of applications; configure, based on the environment configuration, the data environment, to generate a configured data environment, wherein the configured data environment includes a master container and a servant container for each of the plurality of applications; deploy the configured data environment in the data structure; perform one or more tests on data stored in the configured data environment in the data structure to generate one or more test results based on performing the one or more tests on the data; update, based on the one or more test results, the configured data environment, to generate an updated configured data environment, wherein the updated configured data environment meets the requirements of the plurality of applications; change, based on the one or more test results, the configuration of the master container in the updated configured data environment; and automatically change, based on changing the configuration of the master container, the configurations of the servant containers in the updated configured data environment.

According to some implementations, a device may include one or more memories, and one or more processors, communicatively coupled to the one or more memories, configured to: receive an environment configuration for a data environment to be implemented in a data structure, wherein the environment configuration includes requirements of an application; configure, based on the environment configuration, the data environment, to generate a configured data environment; deploy the configured data environment in the data structure; perform one or more tests on data stored in the configured data environment in the data structure to generate one or more test results based on performing the one or more tests on the data; update, based on the one or more test results, the configured data environment, to generate an updated configured data environment, wherein the updated configured data environment meets the requirements of the application; receive a job request for the data structure; and perform the job request in the updated configured data environment in the data structure.

DETAILED DESCRIPTION

Figure 1A:
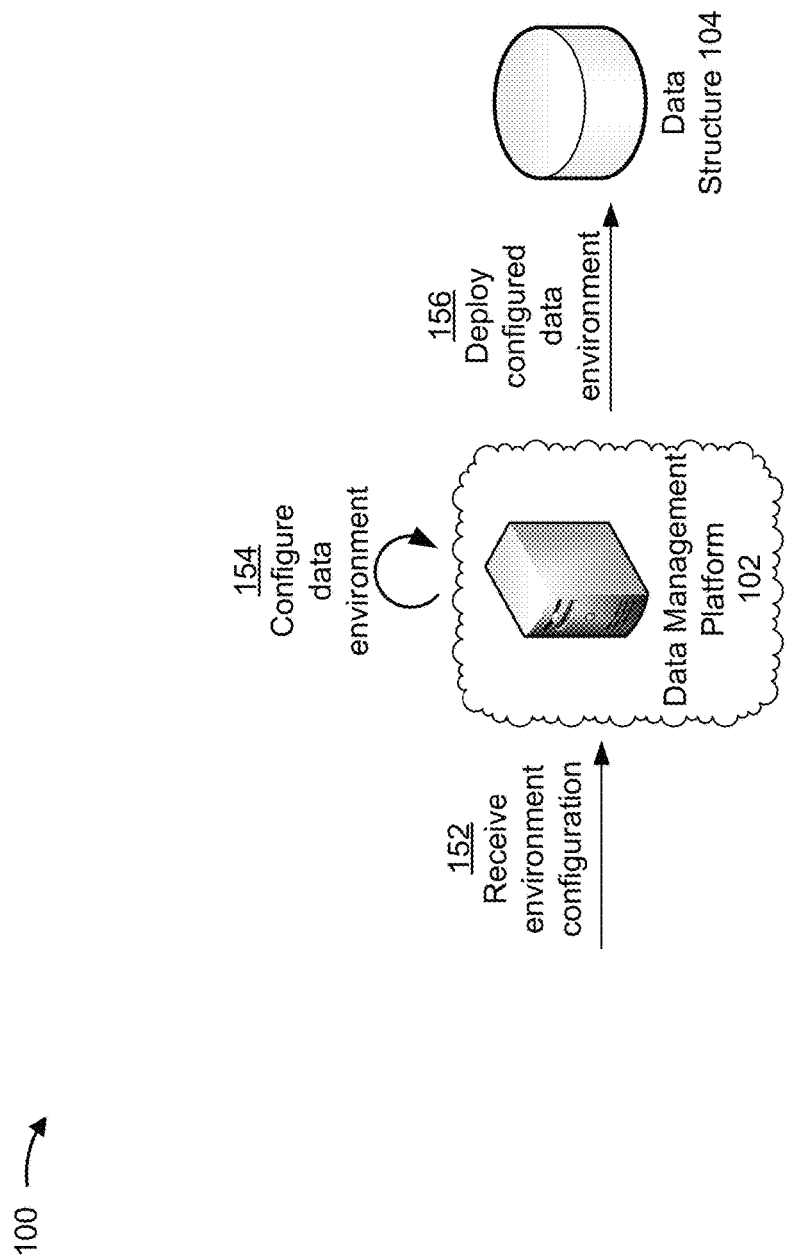
FIGS. 1A-1E are diagrams of one or more example implementations described herein.

The following detailed description of example implementations refers to the accompanying drawings. The same reference numbers in different drawings may identify the same or similar elements.

Data analytics professionals obtain, from disparate data sources, data having different formats, and use data analytics applications having different data formatting requirements for generation of reports, analytical models, artificial intelligence models, and/or the like. Maintaining distinct data structures for each of the data sources and/or for each of the applications consumes computing resources (e.g., processing resources, memory resources, power resources, communication resources, and/or the like) and/or network resources. Furthermore, when a configuration error is identified in one data structure, updating the other distinct data structures to correct the error consumes computing resources (e.g., processing resources, memory resources, power resources, communication resources, and/or the like) and/or network resources.

Data analytics professionals may use metadata validation tests to confirm correspondence of metadata schemas between a given data structure and a given application. However, manually updating, identifying, and/or the like the metadata schemas of the other data structures consumes computing resources (e.g., processing resources, memory resources, power resources, communication resources, and/or the like) and/or network resources.

Additionally, or alternatively, a data analytics professional may need to install, configure, maintain, patch, and/or the like applications used to access a data structure. However, the data analytics professional may need to install, configure, maintain, patch, and/or the like an instance of each application for each machine that accesses the data structure, which consumes computing resources (e.g., processing resources, memory resources, power resources, communication resources, and/or the like) and/or network resources.

Additionally, or alternatively, when an application submits a job request to a data structure and the job request fails (e.g., due to metadata inconsistencies, insufficient computing resources, duplicate data records, incorrect data records, and/or the like), the failure consumes computing resources (e.g., processing resources, memory resources, power resources, communication resources, and/or the like) and/or network resources. Furthermore, analyzing and identifying a cause of the failure consumes computing resources (e.g., processing resources, memory resources, power resources, communication resources, and/or the like) and/or network resources.

Some implementations described herein provide a data management platform that may receive data from disparate sources and provide data to applications having different data formatting requirements, by configuring a data environment to meet the requirements of the applications and deploying the configured data environment in a data structure. By using the configured data environment in the data structure, the data management platform may conserve computing resources (e.g., processing resources, memory resources, power resources, communication resources, and/or the like) and/or network resources that would otherwise be consumed by updating multiple data structures to correct errors when an error is identified in one of the data structures.

In some implementations, the data management platform may perform metadata validation tests by automatically comparing metadata schemas between source and application, source and data structure, and data structure and application, and updating a log with failure entries. The data management platform may use the log to update metadata schemas in the application, the source, and/or the data structure. By automatically comparing metadata schemas and updating the log, the data management platform may conserve computing resources (e.g., processing resources, memory resources, power resources, communication resources, and/or the like) and/or network resources that would otherwise be consumed by manually updating the metadata schemas of other data structures when a metadata error is identified in one data structure.

The data management platform may configure a container for each application, such that a given container provides an application programming interface to a given application and retrieves data from the data structure in a format required by the given application. The containers may be servant containers based on a master container, such that changes to the master container automatically change the servant containers. By configuring servant containers for each application and using the master container, the data management platform may conserve computing resources (e.g., processing resources, memory resources, power resources, communication resources, and/or the like) and/or network resources that would otherwise be consumed by installing, configuring, maintaining, patching, and/or the like an instance of each application for each machine that accesses the data structure.

Additionally, or alternatively, the data management platform may perform data readiness tests and/or data reconciliation to reconcile incomplete data and/or duplicative data, which, if not reconciled, may cause job requests for the data structure to fail. By performing data readiness tests and/or data reconciliation, the data management platform may conserve computing resources (e.g., processing resources, memory resources, power resources, communication resources, and/or the like) and/or network resources that would otherwise be consumed by failed job requests.

Furthermore, the data management platform may use a machine learning model to monitor a job request and, based on a likelihood of the job request failing, stop or interrupt the job request, which may conserve computing resources (e.g., processing resources, memory resources, power resources, communication resources, and/or the like) and/or network resources that would otherwise be consumed by allowing the job request to continue until failure.

In some implementations, the data management platform may facilitate collaboration between development, operations, and quality assurance engineers with respect to an application delivery pipeline as well as a data management method that may facilitate communication collaboration, integration, and automation of one or more processes. For example, the data management platform may obtain appropriate data at an appropriate time, which may ensure that an application is developed using the appropriate data and tested using appropriate data sets.

FIGS. 1A-1E are diagrams of one or more example implementations 100 described herein. For example, as shown in FIGS. 1A-1E, example implementation(s) 100 may include a data management platform 102, a data structure 104, a source system 106, and a client device 108.

In some implementations, one or more entities may maintain one or more of the data management platform 102, the data structure 104, the source system 106, and the client device 108. For example, one entity may maintain the data management platform 102 and the data structure 104, another entity may maintain the source system 106, and yet another entity may maintain the client device 108. Additionally, or alternatively, a single entity may maintain the data management platform 102, the data structure 104, the source system 106, and the client device 108. Additionally, or alternatively, each of the data management platform 102, the data structure 104, the source system 106, and the client device 108 may be maintained by different entities.

As shown in FIG. 1A, and by reference number 152, the data management platform 102 may receive an environment configuration. In some implementations, the environment configuration may include requirements of one or more applications, one or more configuration parameters, and/or the like. For example, the environment configuration may include service requirements for the applications, metadata schema requirements for the applications, and/or the like. In some implementations, the environment configuration may be for a data environment to be implemented in the data structure 104.

In some implementations, the data management platform 102 may receive an environment configuration including requirements of applications, where the requirements for the applications to do not correspond to each other. For example, a first application may require a first metadata schema, and a second application may require a second metadata schema, where the first metadata schema does not correspond to the second metadata schema.

As shown in FIG. 1A, and by reference number 154, the data management platform 102 may configure the data environment. In some implementations, the data management platform 102 may configure, based on the environment configuration, the data environment, to generate a configured data environment. For example, the data management platform 102 may configure the data environment to generate the configured data environment, where the configured data environment meets the requirements of the application (e.g., as included in the environment configuration and/or the like).

In some implementations, the data management platform 102 may configure the data environment to include a master container and one or more servant containers for the applications. For example, the data management platform 102 may configure the data environment to include a servant container for each of the applications. Additionally, or alternatively, the data management platform 102 may configure the data environment to include a servant container for each of one or more groups of applications, where, for a given group of the one or more groups, applications have corresponding requirements (e.g., service requirements and/or the like). In some implementations, changing a configuration of the master container causes corresponding changes to configurations of the servant containers, as described herein with respect to FIG. 1D.

In some implementations, the data management platform 102 may configure the master container to include a suite of main scripts for accessing the data structure (e.g., querying data in the data structure, running reports based on data in the data structure, and/or the like). In some implementations, the data management platform 102 may configure the servant containers to include the suite of main scripts and application programming interfaces (APIs) to permit the applications to communicate with the data management platform 102 and/or the data structure 104.

In some implementations, the data management platform 102 may configure the data environment, based on metadata schema requirements included in the environment configuration, to meet the metadata schema requirements of the applications. In some implementations, the data management platform 102 may configure the data environment to include one or more clusters, where each cluster has a common metadata schema. In some implementations, the metadata schemas of the one or more clusters, in combination, meet the metadata schema requirements of the applications. For example, for a first group of applications having a first metadata schema requirement and a second group of applications having a second metadata schema requirement, the data management platform 102 may configure a first cluster having the first metadata schema requirement and a second cluster having the second metadata schema requirement.

In some implementations, the data management platform 102 may configure the data environment to include, in each cluster, a master container and one or more servant containers. Returning to the example above with the first group of applications and the second group of applications, the data management platform 102 may configure the data environment to include, in the first cluster, a first master container and a servant container for each application of the first group of applications. Similarly, the data management platform 102 may configure the data environment to include, in the second cluster, a second master container and a servant container for each application of the second group of applications. In this way, the data management platform 102 may configure the data environment to generate a configured data environment that meets service requirements for the applications, metadata schema requirements for the applications, and/or the like.

As shown in FIG. 1A, and by reference number 156, the data management platform 102 may deploy the configured data environment in the data structure 104. In some implementations, the data management platform 102 may cause the configured data environment to be instantiated in the data structure 104 in such a manner that the configured data environment may perform functions in the data structure 104 defined for the configured data environment.

Figure 1B:
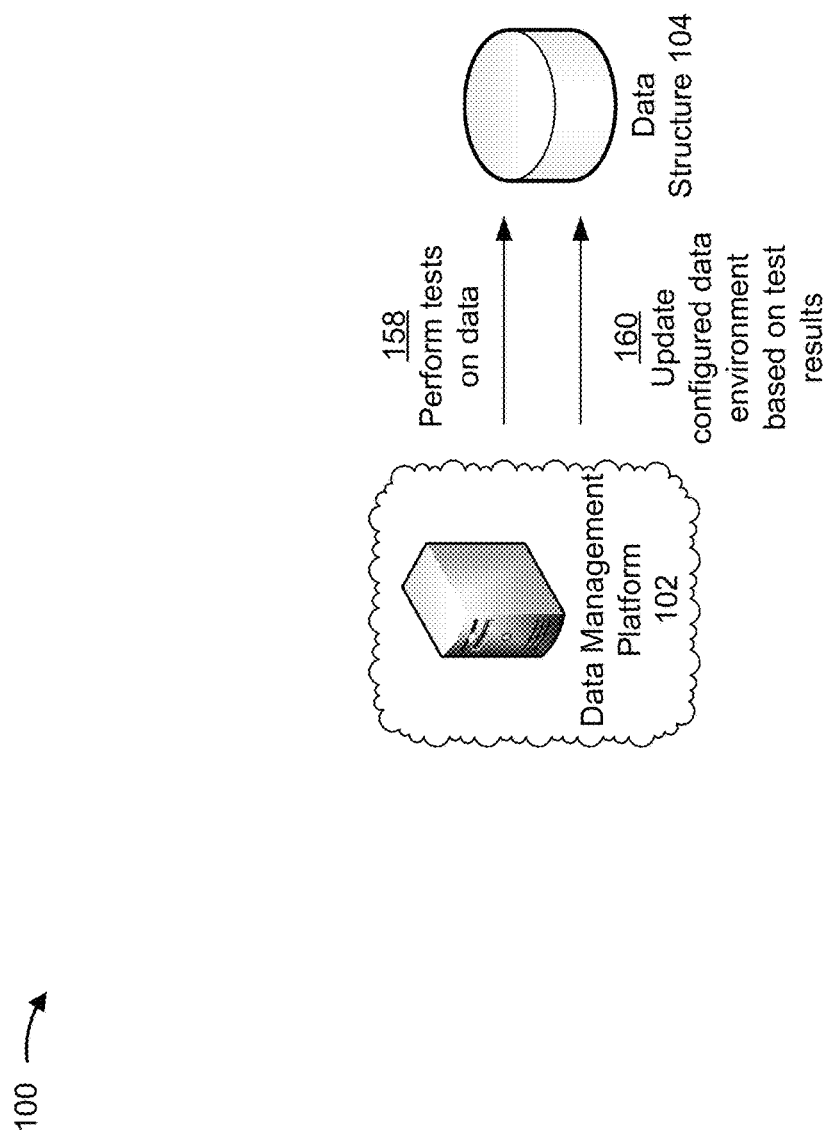

As shown in FIG. 1B, and by reference number 158, the data management platform 102 may perform tests on data in the data structure 104, such as metadata validation tests, data readiness tests, data pipeline tests, and/or the like. In some implementations, the data management platform 102 may perform tests on data in the configured data environment in the data structure. For example, the data management platform 102 may perform one or more tests on data stored in the configured data environment in the data structure 104 to generate test results.

In some implementations, the data management platform 102 may process the test results. In some implementations, the data management platform 102 may process the test results to determine whether the configured data environment is performing functions in the data structure 104. For example, the data management platform 102 may process the test results to determine whether a metadata schema of a cluster corresponds to a metadata schema of an application, where the cluster includes a container for the application.

As shown in FIG. 1B, and by reference number 160, the data management platform 102 may update the configured data environment in the data structure based on the test results. In some implementations, the data management platform 102 may update, based on the test results, the configured data environment, to generate an updated configured data environment, where the updated configured data environment meets the requirements of the plurality of applications.

For example, and as described above, the data management platform 102 may process the test results to determine whether a metadata schema of a cluster corresponds to a metadata schema of an application, where the cluster includes a container for the application. In some implementations, based on determining that the metadata schema of the cluster does not correspond to the metadata schema of the application (e.g., due to a change in the application, due to a change in the requirements of the application, and/or the like), the data management platform 102 may update the configured data environment. For example, the data management platform 102 may update the metadata schema of the cluster (e.g., by updating the master container in the cluster and/or the like). Additionally, or alternatively, the data management platform 102 may create a new container for the application in a different cluster having a metadata schema that corresponds to the metadata schema of the application. Additionally, or alternatively, the data management platform 102 may create a new cluster having a metadata schema that corresponds to the metadata schema of the application and a new container for the application in the new cluster. In this way, the data management platform 102 may update the configured data environment in response to changes in application requirements, which may conserve computing resources (e.g., processing resources, memory resources, power resources, communication resources, and/or the like) and/or network resources that would otherwise be consumed by configuring a new data environment each time an application requirement changed.

Figure 1C:
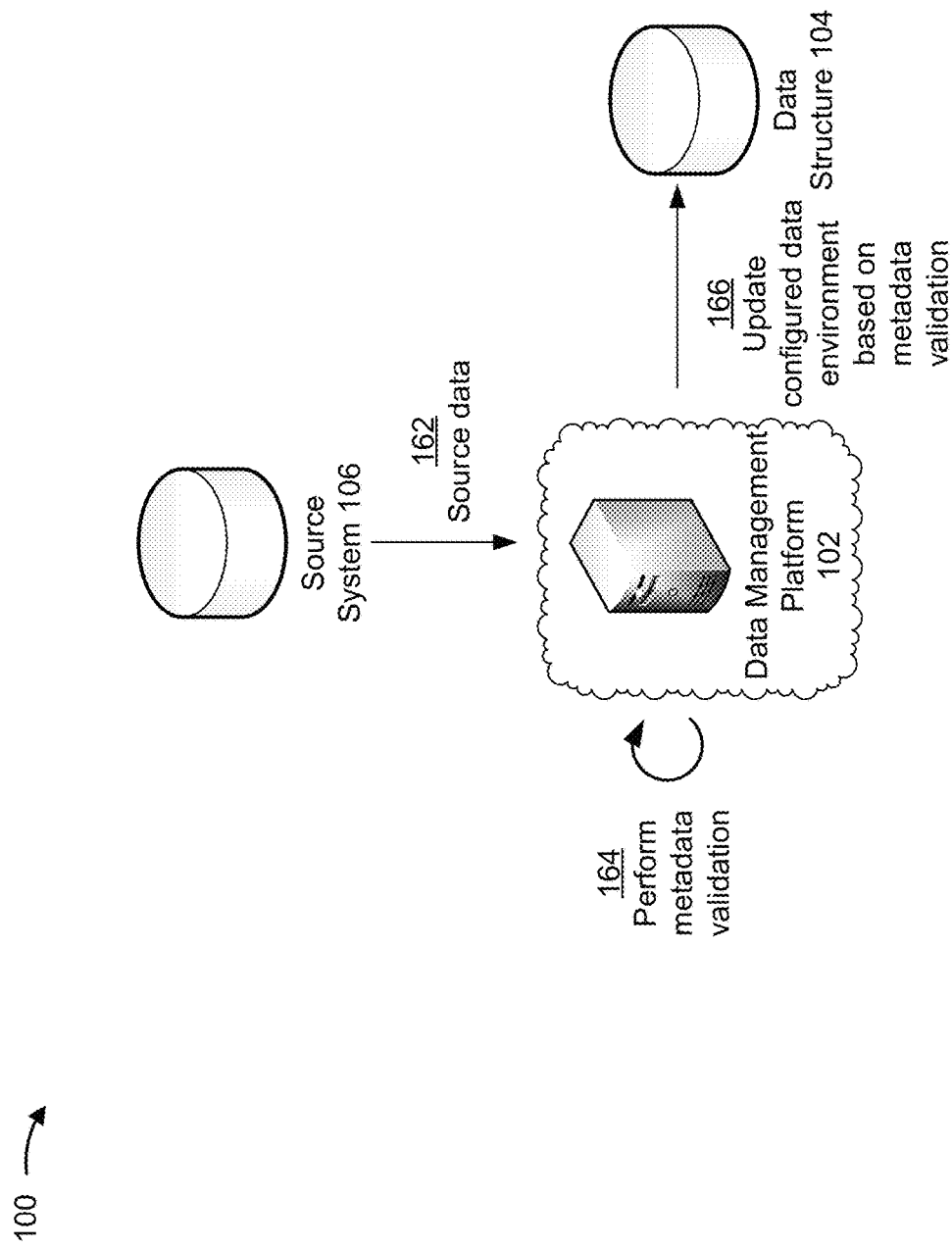

As shown in FIG. 1C, and by reference number 162, the source system 106 may provide, to the data management platform 102, source data. In some implementations, the source system 106 may include an application (e.g., an application of the one or more applications for which the data environment was configured, and/or the like), another data structure, and/or the like. For example, the source system 106 may be another data structure that provides the source data to the data management platform 102 and/or the data structure 104.

As shown in FIG. 1C, and by reference number 164, the data management platform 102 may perform metadata validation on the source data. In some implementations, the data management platform 102 may process the source data to determine a metadata schema of the source data. For example, the data management platform 102 may process data records in the source data to determine the metadata schema of the source data.

In some implementations, the data management platform 102 may perform metadata validation on the source data to confirm that the metadata schema of the source data corresponds to a target metadata schema, where the target metadata schema corresponds to a metadata schema of a container in the data structure, a cluster in the data structure, an application for which the data environment has been configured, and/or the like. In some implementations, the data management platform 102 may create, in a metadata validation log, a metadata field for the source system 106 if the data management platform 102 has never received data from the source system 106.

In some implementations, the data management platform 102 may perform metadata validation on the source data to confirm that the metadata schema of the source data corresponds to the target metadata schema by determining whether a column count in the metadata schema of the source data corresponds to a column count in the target metadata schema, whether column names in the metadata schema of the source data correspond to column names in the target metadata schema, whether a column order in the metadata schema of the source data corresponds to a column order in the target metadata schema, whether a column data type in the metadata schema of the source data corresponds to a column data type in the target metadata schema, and/or the like.

In some implementations, the data management platform 102 may, based on confirming that the metadata schema of the source data corresponds to the target metadata schema, update, in the metadata validation log, the metadata field for the source system 106, add a success entry to a metadata validation table, add the metadata schema of the source data to a metadata details table, store the source data in the data structure, and/or the like. By updating the metadata validation log, adding the entry to the metadata validation table, adding the metadata schema of the source data to a metadata details table, and/or the like, the data management platform 102 may maintain a record regarding metadata validation for the source system 106. In some implementations, if the source system 106 provides source data at another time, the data management platform 102 may refer to the record regarding metadata validation for the source system 106 and forego processing the source data, performing metadata validation again, and/or the like. In this way, the data management platform 102 may conserve computing resources (e.g., processing resources, memory resources, power resources, communication resources, and/or the like) and/or network resources that would otherwise be consumed by processing source data from the source system 106, performing metadata validation, and/or the like, each time the source system 106 provides source data.

In some implementations, the data management platform 102 may, based on determining that the metadata schema of the source data does not correspond to the target metadata schema, add a failure entry to the metadata validation table. For example, the data management platform 102 may, based on the column count in the metadata schema of the source data not corresponding to the column count in the target metadata schema, the column names in the metadata schema of the source data not corresponding to the column names in the target metadata schema, the column order in the metadata schema of the source data not corresponding to the column order in the target metadata schema, the column data type in the metadata schema of the source data not corresponding to the column data type in the target metadata schema, and/or the like, stop the metadata validation, add the failure entry to the metadata validation table, and/or the like.

As described above, the data management platform 102 may perform metadata validation on the source data to confirm that the metadata schema of the source data corresponds to a target metadata schema if the data management platform 102 has never received data from the source system 106. In some implementations, the data management platform 102 may have previously received data from the source system 106, previously created, in the metadata validation log, the metadata field for the source system 106, and previously updated, in the metadata validation log, the metadata field for the source system 106. In some implementations, the data management platform 102 may perform, based on the updated metadata field in the metadata validation log, metadata validation on the source data to confirm that the metadata schema of the source data corresponds to a staging metadata schema, and then perform metadata validation to confirm that the staging metadata schema corresponds to the target metadata schema. In other words, the data management platform 102 may perform, based on the updated metadata field in the metadata validation log, source to staging metadata validation and then staging to target metadata validation.

For example, the data management platform 102 may perform, based on the updated metadata field in the metadata validation log, metadata validation on the source data to confirm that the metadata schema of the source data corresponds to a staging metadata schema. In some implementations, the data management platform 102 may perform metadata validation on the source data to confirm that the metadata schema of the source data corresponds to the staging metadata schema by determining whether a column count in the metadata schema of the source data corresponds to a column count in the staging metadata schema, whether column names in the metadata schema of the source data correspond to column names in the staging metadata schema, whether a column order in the metadata schema of the source data corresponds to a column order in the staging metadata schema, and/or the like. In some implementations, the data management platform 102 may, based on determining that the metadata schema of the source data does not correspond to the staging metadata schema, add a failure entry to the metadata validation table.

In some implementations, the data management platform 102 may, based on confirming that the metadata schema of the source data corresponds to the staging metadata schema, perform metadata validation to confirm that the staging metadata schema corresponds to the target metadata schema, as described above with respect to performing metadata validation on the source data to confirm that the metadata schema of the source data corresponds to the target metadata schema. In some implementations, the data management platform 102 may, based on determining that the staging metadata schema does not correspond to the target metadata schema, stop the metadata validation, add the failure entry to the metadata validation table, and/or the like. In some implementations, the data management platform 102 may, based on determining that the staging metadata schema does correspond to the target metadata schema, add a success entry to the metadata validation table, store the source data in the data structure, and/or the like.

As shown in FIG. 1C, and by reference number 166, the data management platform 102 may update the configured data environment based on the metadata validation. In some implementations, the data management platform 102 may, based on determining that the metadata schema of the source data does not correspond to the target metadata schema, that the metadata schema of the source data does not correspond to the staging metadata schema, or that the staging metadata schema does not correspond to the target metadata schema, revise the staging metadata schema and/or the target metadata schema to correspond to the metadata schema of the source data.

For example, if the target metadata schema corresponds to a metadata schema of a container in the data structure, the data management platform 102 may revise the metadata schema of the container to correspond to the metadata schema of the source data, identify, in the container, one or more scripts impacted by the revised metadata schema, and revise the one or more scripts based on the revised metadata schema. Additionally, or alternatively, if the target metadata schema corresponds to a metadata schema of a cluster in the data structure, the data management platform 102 may revise the metadata schema of the cluster to correspond to the metadata schema of the source data, identify, in a master container in the cluster, one or more scripts impacted by the revised metadata schema, revise the one or more scripts based on the revised metadata schema, and revise one or more scripts in servant containers in the cluster based on the revised scripts in the master container. Additionally, or alternatively, the data management platform 102 may, based on determining that the metadata schema of the source data does not correspond to the target metadata schema, revise the metadata schema of the source data to correspond to the target metadata schema.

In this way, the data management platform 102 may perform metadata validation on source data to maintain quality of the data in the data structure, maintain readiness of the data in the data structure (e.g., for queries, reports, job requests and/or the like), update the configured data environment based on changes to metadata schemas (e.g., of source data, of application requirements, and/or the like), and/or the like.

Figure 1D:
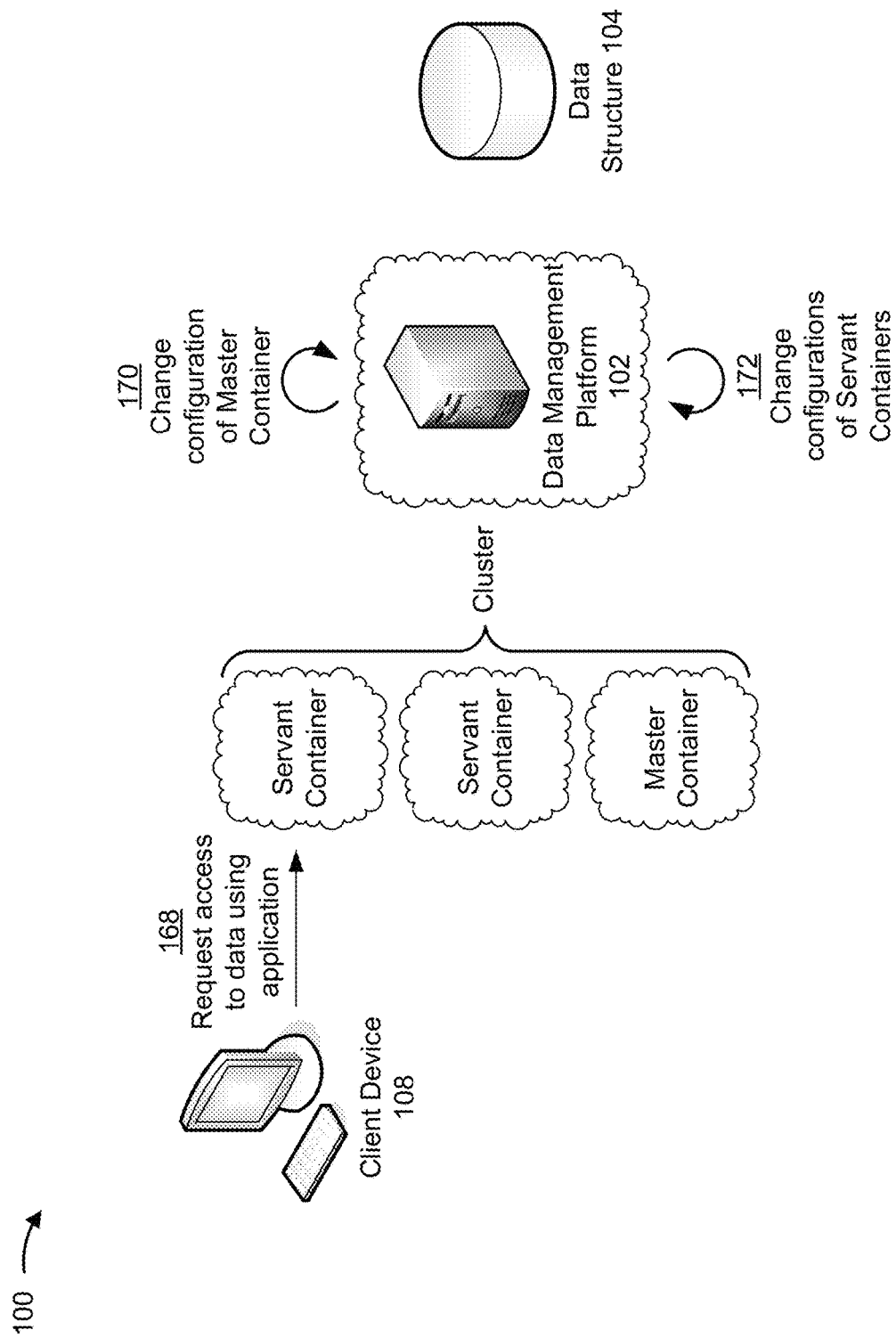

As shown in FIG. 1D, and by reference number 168, the client device 108 may request access to data using an application. For example, the application may communicate with the data management platform 102 using an API in a servant container. As described with respect to FIG. 1A, the data management platform 102 may configure the servant container for the application, for a group of applications including the application, and/or the like.

In some implementations, the client device 108, using the application, may request access to data in the data structure via the servant container, and the servant container may not successfully respond to the request. For example, if the application has changed a metadata schema for requested data, the application has changed a service requirement, the configuration of the data environment has changed, and/or the like, the servant container may not be configured appropriately to respond to the request, and the request for access may fail.

As shown in FIG. 1D, and by reference number 170, the data management platform 102 may change a configuration of the master container. In some implementations, the data management platform 102 may change, based on the request for access failing, the configuration of the master container. For example, the request for access may fail based on the metadata schema for data requested by the application not corresponding to a metadata schema in the data structure, and the data management platform 102 may change the configuration of the master container such that the master container may revise, translate, and/or the like the metadata of data retrieved from the data structure for the application so that the metadata of the retrieved data corresponds to the metadata schema requested by the application. In some implementations, the data management platform 102 may change the configuration of the master container by revising one or more scripts in the master container, adding scripts to the master container, removing scripts from the master container, and/or the like.

As shown in FIG. 1D, and by reference number 172, the data management platform 102 may change configurations of the servant containers. In some implementations, the data management platform 102 may change the configurations of the servant containers based on the changes made to the configuration of the master container. For example, the data management platform 102 may change the configurations of the servant containers by revising one or more scripts in the servant containers, adding scripts to the servant containers, removing scripts from the servant containers, and/or the like corresponding to the changes made to the configuration of the master container.

In some implementations, the data management platform 102 may change the configurations of the servant containers based on the changes made to the configuration of the master container using a virtual network connecting the servant containers and the master container. In some implementations, the data management platform 102 may use a cluster manager to manage clusters and/or containers, and change the configurations of the servant containers based on the changes made to the configuration of the master container. For example, for a configured data environment including a cluster, which includes a master container and servant containers (e.g., as shown in FIG. 1D), the data management platform 102 may change, using the cluster manager, the configuration of the master container, and the cluster manager, via the virtual network, may change the configurations of the servant containers.

In some implementations, the data management platform 102 may change the configurations of the servant container so that the application on the client device 108 and other instances of the application on other client devices may communicate with the data management platform 102 and/or the data structure 104 to request data. In this way, the data management platform 102 may conserve computing resources (e.g., processing resources, memory resources, power resources, communication resources, and/or the like) and/or network resources that would otherwise be consumed by configuring, maintaining, patching, and/or the like an instance of each application for each client device that accesses the data structure 104.

Figure 1E:
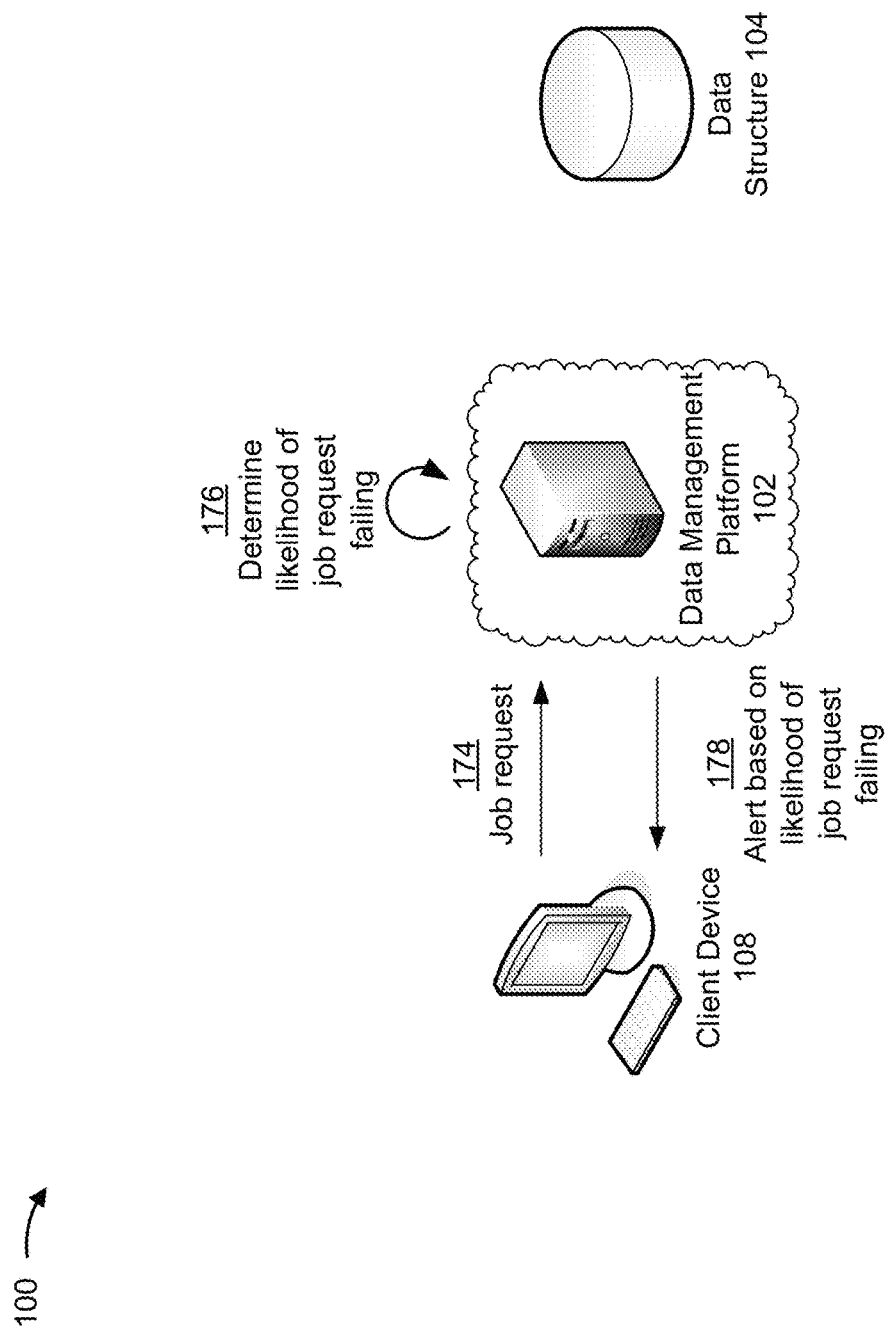

As shown in FIG. 1E, and by reference number 174, the client device 108 may provide, to the data management platform 102, a job request. For example, the application on the client device 108 may provide, to the data management platform 102, the job request. Additionally, or alternatively, an application (e.g., a metadata validation application, a data readiness testing application, and/or the like) running on the data management platform 102, a script running on the data management platform 102, and/or the like may generate a job request. In some implementations, the job request may be a request for data from the data structure, a query regarding data in the data structure, a request for a report providing information regarding data in the data structure, an automated data readiness test on data in the data structure, an automated metadata validation test on data in the data structure, and/or the like.

As shown in FIG. 1E, and by reference number 176, the data management platform 102 may determine a likelihood of the job request failing. In some implementations, the data management platform 102 may process the job request using a machine learning model to determine the likelihood of the job request failing. As described herein, the data management platform 102 may use one or more artificial intelligence techniques, such as machine learning, deep learning, and/or the like to determine the likelihood of the job request failing.

In some implementations, the data management platform 102 may parse natural language descriptions of historical job requests (e.g., historical job execution logs and/or the like), outcomes of the historical job requests, and/or the like. For example, the data management platform 102 may obtain data identifying, in natural language, descriptions of job features (e.g., types of job requests, applications providing the job requests, resources (e.g., memory, processor cores, and/or the like) used for the jobs, available resources during the jobs, and/or the like) of historical job requests, descriptions of outcomes of the historical job requests (e.g., whether the job requests failed and/or the like), and/or the like, and may parse the data to identify job features associated with a likelihood of failing, and/or the like.

In some implementations, the data management platform 102 may determine a characteristic of a job feature based on natural language processing of historical job requests (e.g., historical job execution logs and/or the like), which may include a description of the job features. For example, based on a description of a job feature being identified as causing a failure, being associated with a failure, and/or the like, the data management platform 102 may use natural language processing to determine that a characteristic of the job feature is that the job feature is associated with a likelihood of the job request failing. Similarly, based on a description of the job feature being identified as not causing a failure, not being associated with a failure, and/or the like, the data management platform 102 may use natural language processing to determine that a characteristic of the job feature is that the job feature is not associated with a likelihood of the job request failing. In this case, the data management platform 102 may determine that a natural language text corresponds to a characteristic of a job feature, based on data relating to other job features, data identifying characteristics of job features, and/or the like.

In this way, the data management platform 102 may identify characteristics associated with job features, as described herein. Based on applying a rigorous and automated process associated with identifying characteristics associated with job features, the data management platform 102 enables recognition and/or identification of thousands or millions of characteristics for thousands or millions of job features, thereby increasing an accuracy and consistency of determining a likelihood of a job request failing, relative to requiring computing resources to be allocated for hundreds or thousands of technicians to manually determine likelihoods of the thousands or millions of job requests failing.

In some implementations, the data management platform 102 may determine whether a job feature is or can be associated with a likelihood of a job request failing, as described herein. For example, using historical information (e.g., historical job execution logs and/or the like), the data management platform 102 may determine whether a job feature is or can be associated with a likelihood of a job request failing. In this case, the data management platform 102 may generate a failure prediction model. For example, the data management platform 102 may train a model using historical information that includes a plurality of job requests (e.g., job features of each job request and/or the like), a plurality of outcomes of the job requests (e.g., whether the job requests failed and/or the like), and/or the like, to determine whether job features are associated with a likelihood of job requests failing. As an example, the data management platform 102 may determine that past job features are associated with a threshold probability of being associated with job requests failing. In some implementations, the data management platform 102 may use a scoring system (e.g., with relatively high scores and/or relatively low scores) to identify and/or classify job features as being associated with one another. In this case, the data management platform 102 may determine that a relatively high score (e.g., as being likely to be associated with a likelihood of a job request failing) is to be assigned to job features that are determined to be the same or similar as previously identified job features of the particular job feature (or more frequently identified than past identified job features). In contrast, the data management platform 102 may determine that a relatively low score (e.g., as being unlikely to be associated with a likelihood of a job request failing) is to be assigned to job features that are determined to be different than past identified job features of the particular job feature (or less frequently identified than past identified job features).

In some implementations, the data management platform 102 may perform a data preprocessing operation when generating the failure prediction model. For example, the data management platform 102 may preprocess data (e.g., historical information regarding job requests (e.g., job features of each job request and/or the like), historical outcomes of the job requests (e.g., whether the job requests failed and/or the like), and/or the like) to remove non-ASCII characters, white spaces, confidential data (e.g., personal information, medical information, and/or the like, and/or the like), and/or the like. In this way, the data management platform 102 may organize thousands, millions, or billions of data items for machine learning and model generation.

In some implementations, the data management platform 102 may perform a training operation when generating the failure prediction model. For example, the data management platform 102 may portion data of the historical information into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the data management platform 102 may preprocess and/or perform dimensionality reduction to reduce the data of the historical information to a minimum feature set. In some implementations, the data management platform 102 may train the failure prediction model on this minimum feature set, thereby reducing processing to train the machine learning model, and may apply a classification technique, to the minimum feature set.

In some implementations, the data management platform 102 may use a classification technique, such as a logistic regression classification technique, a random forest classification technique, a gradient boosting machine learning (GBM) technique, and/or the like, to determine a categorical outcome (e.g., that a job feature is associated with a likelihood of a job request failing, that a job feature is not associated with a likelihood of a job request failing, and/or the like). Additionally, or alternatively, the data management platform 102 may use a naïve Bayesian classifier technique. In this case, the data management platform 102 may perform binary recursive partitioning to split the data of the minimum feature set into partitions and/or branches and use the partitions and/or branches to perform predictions (e.g., that a job feature is or is not associated with a likelihood of a job request failing). Based on using recursive partitioning, the data management platform 102 may reduce utilization of computing resources relative to manual, linear sorting and analysis of data items, thereby enabling use of thousands, millions, or billions of data items to train a model, which may result in a more accurate model than using fewer data items.

Additionally, or alternatively, the data management platform 102 may use a support vector machine (SVM) classifier technique to generate a non-linear boundary between data items in the training set. In this case, the non-linear boundary is used to classify test data (e.g., data relating job features) into a particular class (e.g., a class indicating that the job feature is associated with a likelihood of a job request failing, a class indicating that the job feature is not associated with a likelihood of a job request failing, and/or the like).

Additionally, or alternatively, where the test data includes image data, video data, and/or the like, the data management platform 102 may use a computer vision technique, such as a convolutional neural network technique to assist in classifying test data (e.g., data relating job features) into a particular class (e.g., a class indicating that the job feature is associated with a likelihood of a job request failing, a class indicating that the job feature is associated with a likelihood of a job request failing, and/or the like). In some cases, the computer vision technique may include using an image recognition technique (e.g., an Inception framework, a ResNet framework, a Visual Geometry Group (VGG) framework, and/or the like), an object detection technique (e.g., a Single Shot Detector (SSD) framework, a You Only Look Once (YOLO) framework, and/or the like), an object in motion technique (e.g., an optical flow framework and/or the like), and/or the like.

Additionally, or alternatively, the data management platform 102 may train the failure prediction model using a supervised training procedure that includes receiving input to the model from a subject matter expert, which may reduce an amount of time, an amount of processing resources, and/or the like to train the failure prediction model relative to an unsupervised training procedure. In some implementations, the data management platform 102 may use one or more other model training techniques, such as a neural network technique, a latent semantic indexing technique, and/or the like. For example, the data management platform 102 may perform an artificial neural network processing technique (e.g., using a two-layer feedforward neural network architecture, a three-layer feedforward neural network architecture, and/or the like) to perform pattern recognition with regard to patterns of whether job features are associated with a likelihood of job requests failing described using different semantic descriptions can be used to determine whether job features are associated with a likelihood of job requests failing or not. In this case, using the artificial neural network processing technique may improve an accuracy of a model (e.g., the failure prediction model) generated by the data management platform 102 by being more robust to noisy, imprecise, or incomplete data, and by enabling the data management platform 102 to detect patterns and/or trends undetectable to human analysts or systems using less complex techniques.

As an example, the data management platform 102 may use a supervised multilabel classification technique to train the model. For example, as a first step, the data management platform 102 may map parameters to a job feature. In this case, the parameters may be characterized as associated with a likelihood of a job request failing or not associated with a likelihood of a job request failing based on characteristics of the parameters (e.g., whether a characteristic of a parameter is similar or associated with a characteristics of the job feature) and an analysis of the parameters (e.g., by a technician, thereby reducing processing relative to the data management platform 102 being required to analyze each activity). As a second step, the data management platform 102 may determine classifier chains, whereby labels of target variables may be correlated (e.g., in this example, labels may be parameters and correlation may refer to a common characteristic of a job feature). In this case, the data management platform 102 may use an output of a first label as an input for a second label (as well as one or more input features, which may be other data relating to the job features), and may determine a likelihood that a particular parameter that includes a set of characteristics (some of which are associated with a particular job feature and some of which are not associated with the particular job feature) are associated with the particular job feature based on a similarity to other parameters that include similar characteristics. In this way, the data management platform 102 transforms classification from a multilabel-classification problem to multiple single-classification problems, thereby reducing processing utilization. As a third step, the data management platform 102 may determine a Hamming loss metric relating to an accuracy of a label in performing a classification by using the validation set of the data. For example, an accuracy with which a weighting applied to each parameter or characteristic and whether each parameter or characteristic is associated with a job feature or not, results in a correct prediction of whether a job feature is associated with a likelihood of a job request failing or not, thereby accounting for differing amounts to which association of any one parameter or characteristic influences being associated with a likelihood of a job request failing or not. As a fourth step, the data management platform 102 may finalize the model based on labels that satisfy a threshold accuracy associated with the Hamming loss metric and may use the model for subsequent prediction of whether parameters of a job feature are to result in an association with a likelihood of a job request failing.

As another example, the data management platform 102 may determine, using a linear regression technique, that a threshold percentage of job features, in a set of job features, are not associated with a likelihood of a job request failing, and may determine that those job features are to receive relatively low association scores. In contrast, the data management platform 102 may determine that another threshold percentage of job features are associated with a likelihood of a job request failing and may assign a relatively high association score to those job features. Based on the job features being associated with a likelihood of a job request failing or not, the data management platform 102 may generate the failure prediction model and may use the failure prediction model for analyzing new job features, and/or the like) that the data management platform 102 identifies.

In some implementations, a different device, such as a server device, may generate and train the model (e.g., the failure prediction model). The different device may send the model for use by the data management platform 102. The different device may update and send (e.g., on a scheduled basis, on an on-demand basis, on a triggered basis, on a periodic basis, and/or the like) the model to the data management platform 102.

Accordingly, the data management platform 102 may use various artificial intelligence techniques, machine learning techniques, deep learning techniques, and/or the like to determine whether job features are associated with a likelihood of a job request failing and determine, based on the job features of a job request and whether the job features are associated with a likelihood of a job request failing, a likelihood of the job request failing.

As shown in FIG. 1E, and by reference number 178, the data management platform 102 may provide, to the client device 108, an alert based on the likelihood of the job request failing. In some implementations, the alert may include a notification, a message, an email, and/or the like. For example, the data management platform 102 may provide, to the client device 108, a message indicating that the job request has a high likelihood of failure, that the data management platform 102 will not provide the job request to the data structure 104, and/or the like. In some implementations, the alert may indicate job features of the job request that are associated with the likelihood of the job request failing.

In some implementations, the data management platform 102 may provide, to the client device 108, the alert based on the likelihood of the job request failing satisfying a threshold (e.g., a likelihood of failure greater than 50 percent, 60 percent, 75 percent, 80 percent, 85 percent, 90 percent, 95 percent, 99 percent, and/or the like). For example, the data management platform 102 may determine whether the likelihood of the job request failing satisfies the threshold, and may provide, to the client device 108 and based on the likelihood satisfying the threshold, the alert.

Additionally, or alternatively, the data management platform 102 may provide, to the client device 108, a message indicating that the job request has a high likelihood of success, an estimated time for completion of the job request, that the data management platform 102 has provided the job request to the data structure 104, and/or the like. In some implementations, the alert may indicate job features of the job request that are associated with the likelihood of the job request succeeding.

In some implementations, the data management platform 102 may perform the job request and/or provide the job request to the data structure 104, and may monitor the performance of the job request. In some implementations, the data management platform 102 may, using the failure prediction model, monitor the performance of the job request, to determine a likelihood of the job request failing as the job request is being performed. For example, some job features, such as resources (e.g., memory, processor cores, and/or the like) available and/or the like, may change as the job request is being performed, and as the job features change, the data management platform 102 may, using the failure prediction model, determine the likelihood of the job request failing in real-time or near real-time based on the changing job features. Additionally, or alternatively, the data management platform 102 may provide, to the client device 108, an alert, interrupt the performance of the job request, and/or the like, based on the likelihood of the job request failing, determined in real-time or near real-time, satisfying the threshold. Additionally, or alternatively, the data management platform 102 may provide, to the client device 108, an alert, stop initiation of the performance of the job request before the performance has begun, and/or the like, based on the likelihood of the job request failing, determined in real-time or near real-time, satisfying the threshold.

In this way, the data management platform 102 may monitor job requests and, based on the likelihoods of the job requests failing, provide alerts regarding the job requests, stop the job requests, or interrupt the performance of the job requests, which may conserve computing resources (e.g., processing resources, memory resources, power resources, communication resources, and/or the like) and/or network resources that would otherwise be consumed by allowing the job requests to continue until failure.

In some implementations, the data management platform 102 may perform a data-readiness test on data in the data structure 104. In some implementations, the data-readiness test may include comparing characteristics (e.g., column counts, incremental data, and/or the like) of data records in the data structure and characteristics of received data, comparing data records in the data structure and corresponding data records of received data (e.g., confirming that stored financial data records match received financial data records and/or the like), identifying formatting issues (e.g., incorrectly formatted dates, incorrectly placed or missing commas in currency data, and/or the like) in data in the data structure, identifying duplicate data records (e.g., due to duplicates in source data, due to repeated loading and storing of source data, and/or the like) in the data structure, comparing data records in the data structure and corresponding data records in the data structure (e.g., confirming that a first set of financial data record data from a first entity match a second set of financial record data from a second entity, where the first entity and the second entity agree that the sets match, and/or the like), and/or the like.

In some implementations, the data management platform 102 may perform the data-readiness test on data in the data structure 104 to generate results of the data-readiness test. For example, the results of the data-readiness test may identify errors in the data in the data structure 104.

In some implementations, the data management platform 102 may, based on results of the data-readiness test, perform data reconciliation using instructions from the client device 108. For example, the data management platform 102 may provide, based on the results of the data-readiness test, a report to the client device 108, receive, from the client device 108, instructions for reconciling the data, and perform, based on the instructions, data reconciliation to correct the errors in the data structure 104.

Additionally, or alternatively, the data management platform 102 may, based on results of the data-readiness test, perform data reconciliation. For example, the data management platform 102 may process the results of the data-readiness test to generate instructions for reconciling the data, and perform, based on the instructions, data reconciliation to correct the errors in the data structure 104.

In this way, the data management platform 102 may perform data readiness tests and/or data reconciliation to reconcile incomplete data and/or duplicative data in the data structure 104, which, if not reconciled, may cause job requests for the data structure to fail. By performing data readiness tests and/or data reconciliation, the data management platform may conserve computing resources (e.g., processing resources, memory resources, power resources, communication resources, and/or the like) and/or network resources that would otherwise be consumed by failed job requests.

In some implementations, the data management platform 102 may perform a data pipeline test on data in the data structure 104. In some implementations, the data pipeline test may include comparing a size of a data record in a source and a size of a data record in a staging area, comparing a count of rows in a table of the source and a count of rows in a table of the staging area, comparing a count of rows in the staging area and a count of rows in a transformed output table in a target system, comparing an aggregation of an amount in a column of a database table in the source and an aggregation of an amount in a column of a database table in the staging area, comparing the aggregation of the amount in the column of the database table in the staging area and an aggregation of an amount in a column of a database table in the target system, comparing rows from a table of the source and rows from a table of the staging area, comparing rows from the staging area and a transformed output table in the target system, and/or the like.

As indicated above, FIGS. 1A-1E are provided merely as one or more examples. Other examples may differ from what is described with regard to FIGS. 1A-1E.

Figure 2:
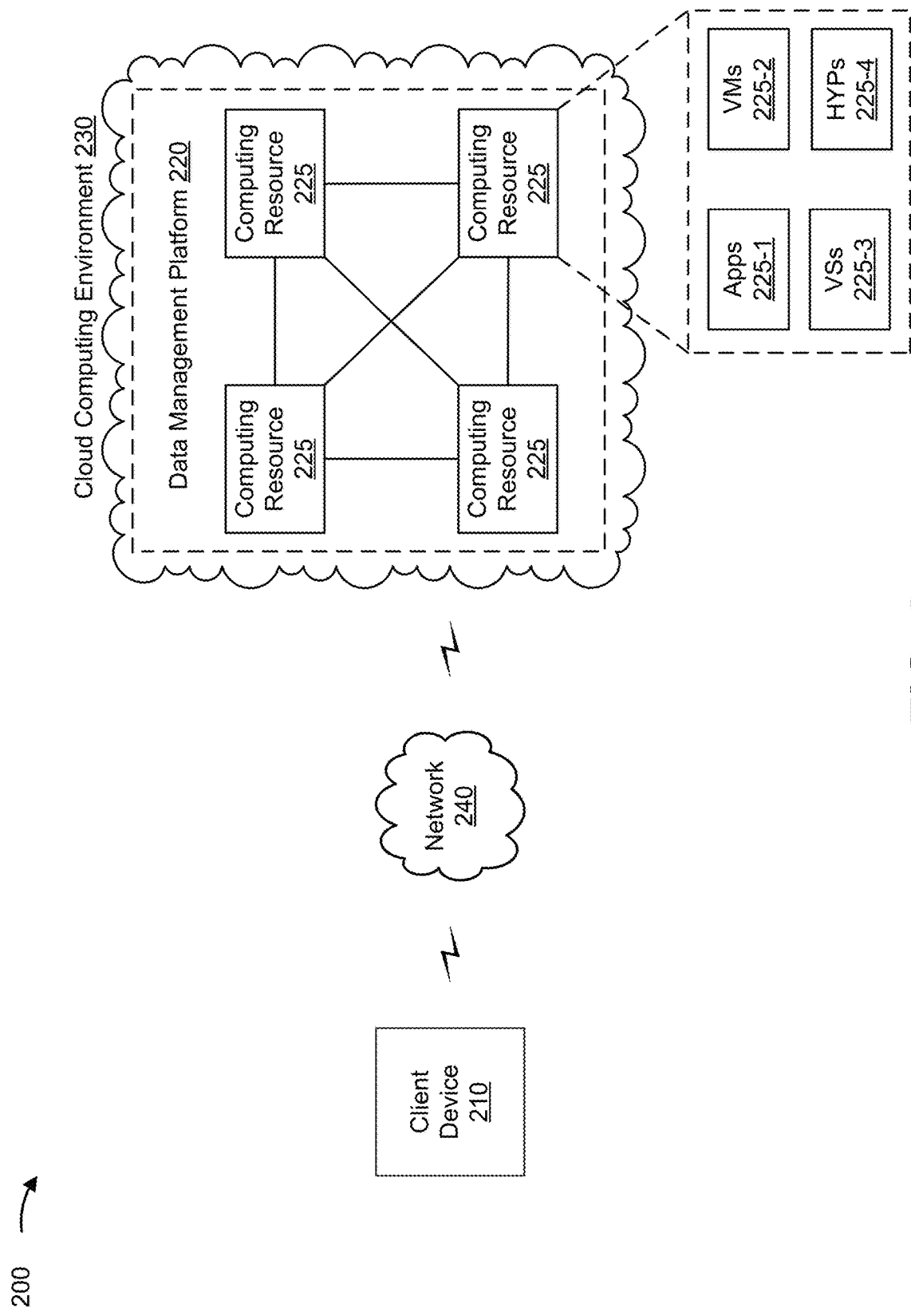
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a data management platform 220, a computing resource 225, a cloud computing environment 230, and a network 240. Devices of environment 200 may interconnect via wired connections, wireless connections, or a combination of wired and wireless connections.

Client device 210 includes one or more devices capable of receiving, generating, storing, processing, and/or providing information associated with requesting and/or analyzing data. For example, client device 210 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Data management platform 220 includes one or more computing resources assigned to configure, test, and/or manage a data environment in a data structure. For example, data management platform 220 may be a platform implemented by cloud computing environment 230 that may configure, test, and/or manage a data environment in a data structure. In some implementations, data management platform 220 is implemented by computing resources 225 of cloud computing environment 230.

Data management platform 220 may include a server device or a group of server devices. In some implementations, data management platform 220 may be hosted in cloud computing environment 230. Notably, while implementations described herein may describe data management platform 220 as being hosted in cloud computing environment 230, in some implementations, data management platform 220 may be non-cloud-based or may be partially cloud-based.

Cloud computing environment 230 includes an environment that delivers computing as a service, whereby shared resources, services, and/or the like may be provided to configure, test, and/or manage a data environment in a data structure. Cloud computing environment 230 may provide computation, software, data access, storage, and/or other services that do not require end-user knowledge of a physical location and configuration of a system and/or a device that delivers the services. As shown, cloud computing environment 230 may include a data management platform 220 and a computing resource 225.

Computing resource 225 includes one or more personal computers, workstation computers, server devices, or another type of computation and/or communication device. In some implementations, computing resource 225 may host data management platform 220. The cloud resources may include compute instances executing in computing resource 225, storage devices provided in computing resource 225, data transfer devices provided by computing resource 225, and/or the like. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by client device 210. Application 225-1 may eliminate a need to install and execute the software applications on client device 210. For example, application 225-1 may include software associated with data management platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program and may support a single process. In some implementations, virtual machine 225-2 may execute on behalf of a user (e.g., client device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
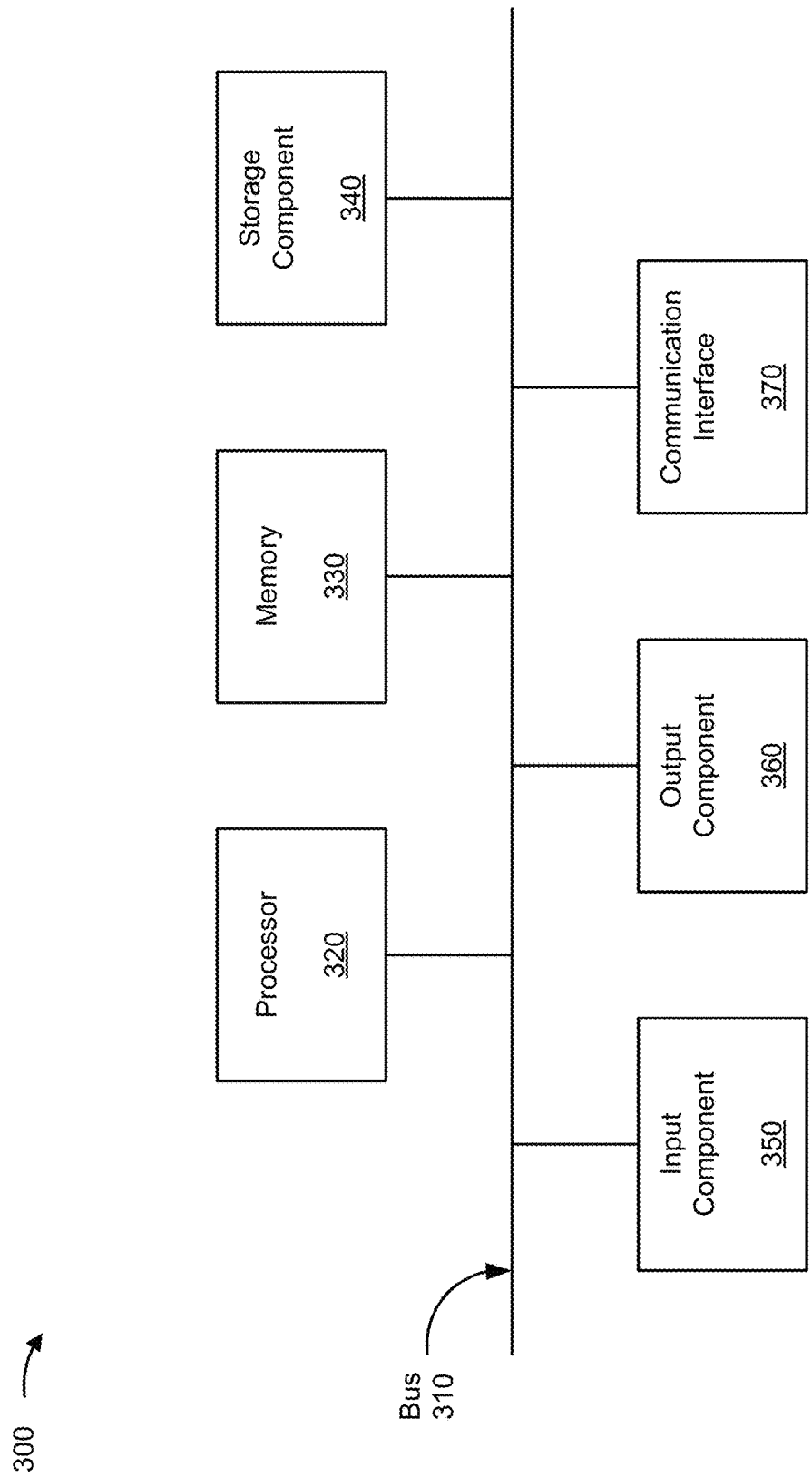
FIG. 3 is a diagram of example components of one or more devices of FIG. 2.

FIG. 3 is a diagram of example components of a device 300. Device 300 may correspond to client device 210, data management platform 220, and/or computing resource 225. In some implementations, client device 210, data management platform 220, and/or computing resource 225 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
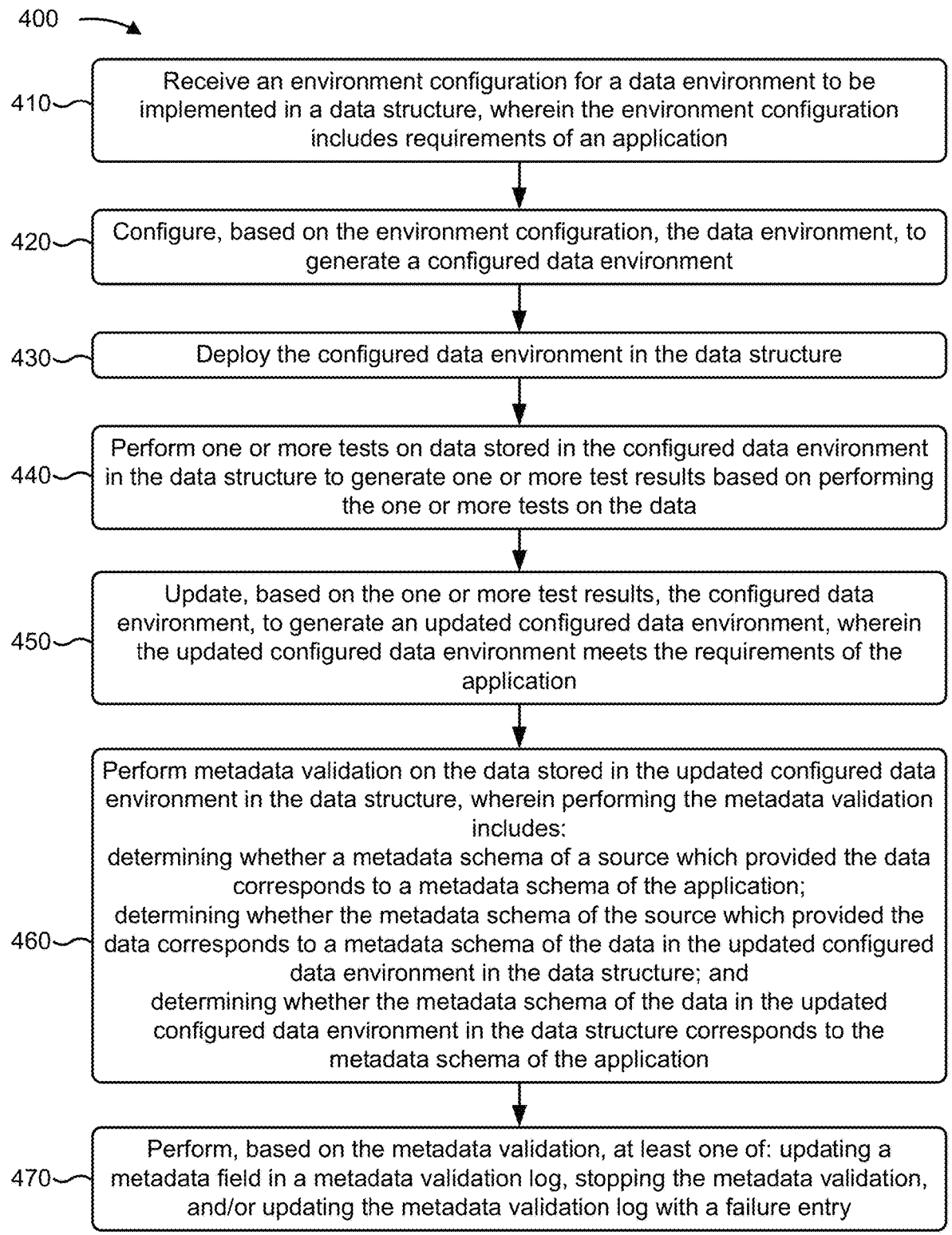
FIGS. 4-6 are flow charts of example processes for configuring and testing a data environment in a data structure.

FIG. 4 is a flow chart of an example process 400 for configuring and testing a data environment in a data structure. In some implementations, one or more process blocks of FIG. 4 may be performed by a data management platform (e.g., data management platform 220). In some implementations, one or more process blocks of FIG. 4 may be performed by another device or a group of devices separate from or including the data management platform, such as such as a client device (e.g., client device 210), a computing resource (e.g., computing resource 225), and/or the like.

As shown in FIG. 4, process 400 may include receiving an environment configuration for a data environment to be implemented in a data structure, wherein the environment configuration includes requirements of an application (block 410). For example, the data management platform (e.g., using processor 320, memory 330, storage component 340, input component 350, output component 360, communication interface 370, and/or the like) may receive an environment configuration for a data environment to be implemented in a data structure, as described above. In some implementations, the environment configuration includes requirements of an application.

As further shown in FIG. 4, process 400 may include configuring, based on the environment configuration, the data environment, to generate a configured data environment (block 420). For example, the data management platform (e.g., using processor 320, memory 330, storage component 340, input component 350, output component 360, communication interface 370, and/or the like) may configure, based on the environment configuration, the data environment, to generate a configured data environment, as described above.

As further shown in FIG. 4, process 400 may include deploying the configured data environment in the data structure (block 430). For example, the data management platform (e.g., using processor 320, memory 330, storage component 340, input component 350, output component 360, communication interface 370, and/or the like) may deploy the configured data environment in the data structure, as described above.

As further shown in FIG. 4, process 400 may include performing one or more tests on data stored in the configured data environment in the data structure to generate one or more test results based on performing the one or more tests on the data (block 440). For example, the data management platform (e.g., using processor 320, memory 330, storage component 340, input component 350, output component 360, communication interface 370, and/or the like) may perform one or more tests on data stored in the configured data environment in the data structure to generate one or more test results based on performing the one or more tests on the data, as described above.

As further shown in FIG. 4, process 400 may include updating, based on the one or more test results, the configured data environment, to generate an updated configured data environment, wherein the updated configured data environment meets the requirements of the application (block 450). For example, the data management platform (e.g., using processor 320, memory 330, storage component 340, input component 350, output component 360, communication interface 370, and/or the like) may update, based on the one or more test results, the configured data environment, to generate an updated configured data environment, as described above. In some implementations, the updated configured data environment meets the requirements of the application.

As further shown in FIG. 4, process 400 may include performing metadata validation on the data stored in the updated configured data environment in the data structure, wherein performing the metadata validation includes: determining whether a metadata schema of a source which provided the data corresponds to a metadata schema of the application; determining whether the metadata schema of the source which provided the data corresponds to a metadata schema of the data in the updated configured data environment in the data structure; and determining whether the metadata schema of the data in the updated configured data environment in the data structure corresponds to the metadata schema of the application (block 460). For example, the data management platform (e.g., using processor 320, memory 330, storage component 340, input component 350, output component 360, communication interface 370, and/or the like) may perform metadata validation on the data stored in the updated configured data environment in the data structure, as described above. In some implementations, performing the metadata validation includes determining whether a metadata schema of a source which provided the data corresponds to a metadata schema of the application; determining whether the metadata schema of the source which provided the data corresponds to a metadata schema of the data in the updated configured data environment in the data structure; and determining whether the metadata schema of the data in the updated configured data environment in the data structure corresponds to the metadata schema of the application.

As further shown in FIG. 4, process 400 may include performing, based on the metadata validation, at least one of: updating a metadata field in a metadata validation log, stopping the metadata validation, or updating the metadata validation log with a failure entry (block 470). For example, the data management platform (e.g., using processor 320, memory 330, storage component 340, input component 350, output component 360, communication interface 370, and/or the like) may perform, based on the metadata validation, at least one of: updating a metadata field in a metadata validation log, stopping the metadata validation, or updating the metadata validation log with a failure entry, as described above.

Process 400 may include additional implementations, such as any single implementation or any combination of implementations described below and/or in connection with one or more other processes described elsewhere herein.

In a first implementation, configuring the data environment to generate the configured data environment includes generating a master container in the configured data environment and generating, based on the master container and for each application of a plurality of applications including the application, a servant container, wherein changing a configuration of the master container causes corresponding changes to configurations of the servant containers.

In a second implementation, alone or in combination with the first implementation, process 400 includes changing, based on the one or more test results, the configuration of the master container and automatically changing, based on changing the configuration of the master container, the configurations of the servant containers.

In a third implementation, alone or in combination with one or more of the first and second implementations, performing the one or more tests on the data stored in the configured data environment in the data structure includes performing a data-readiness test, wherein the data-readiness test includes at least one of comparing characteristics of data records in the configured data environment in the data structure and characteristics of received data, comparing data records in the configured data environment in the data structure and corresponding data records of received data, identifying formatting issues in data records in the configured data environment in the data structure, identifying duplicate data records in the configured data environment in the data structure, or comparing data records in the configured data environment in the data structure and corresponding data records in the configured data environment in the data structure.

In a fourth implementation, alone or in combination with one or more of the first through third implementations, process 400 includes receiving a job request for the data structure, processing, using a machine learning model, the job request to determine a likelihood of the job request failing, and stopping, based on the likelihood satisfying a threshold, the job request.

In a fifth implementation, alone or in combination with one or more of the first through fourth implementations, process 400 includes receiving a job request for the data structure, performing the job request, monitoring, using a machine learning model, performance of the job request to determine a likelihood of the job request failing, and interrupting, based on the likelihood satisfying a threshold, the performance of the job request.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
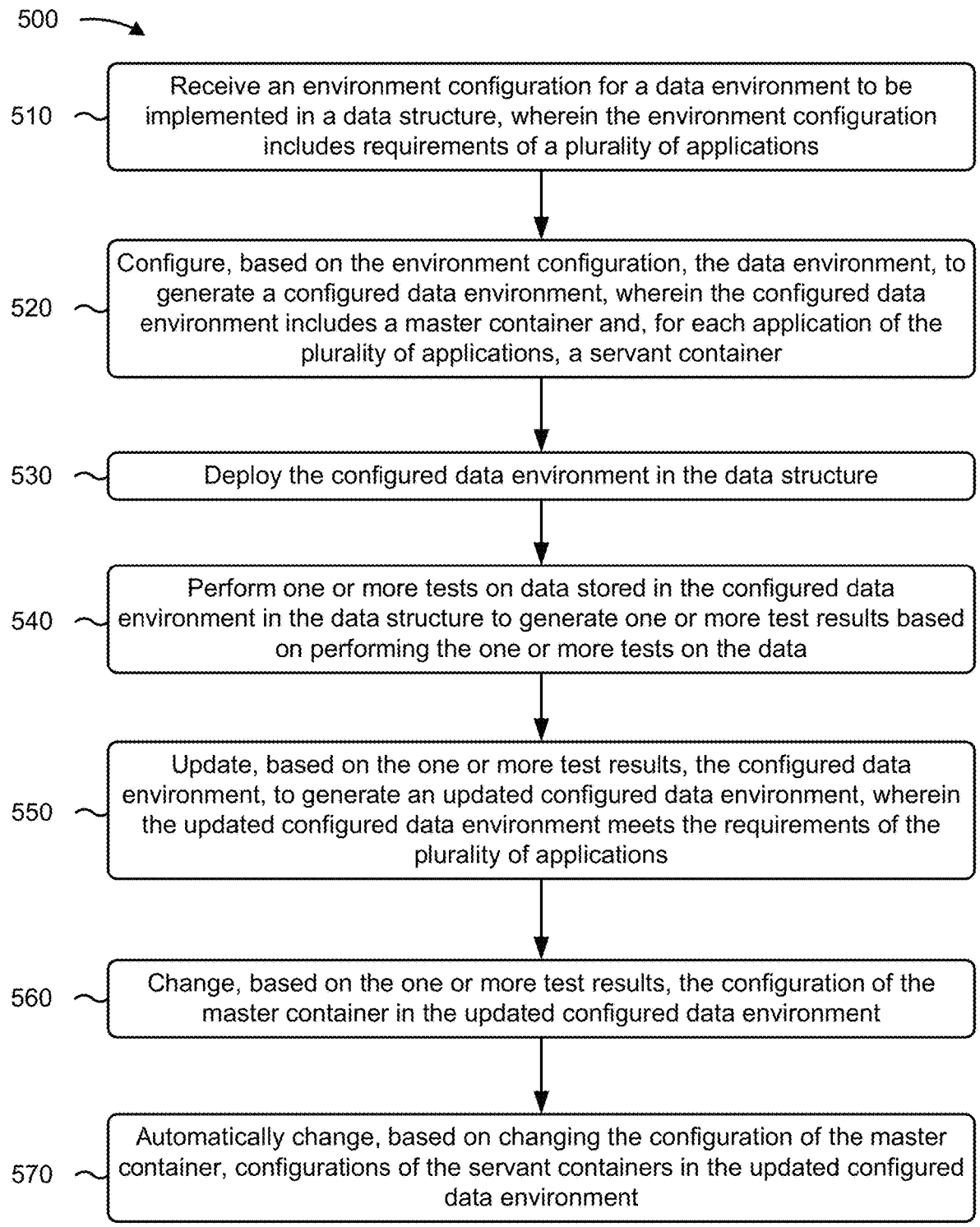

FIG. 5 is a flow chart of an example process 500 for configuring and testing a data environment in a data structure. In some implementations, one or more process blocks of FIG. 5 may be performed by a data management platform (e.g., data management platform 220). In some implementations, one or more process blocks of FIG. 5 may be performed by another device or a group of devices separate from or including the data management platform, such as such as a client device (e.g., client device 210), a computing resource (e.g., computing resource 225), and/or the like.

As shown in FIG. 5, process 500 may include receiving an environment configuration for a data environment to be implemented in a data structure, wherein the environment configuration includes requirements of a plurality of applications (block 510). For example, the data management platform (e.g., using processor 320, memory 330, storage component 340, input component 350, output component 360, communication interface 370, and/or the like) may receive an environment configuration for a data environment to be implemented in a data structure, as described above. In some implementations, the environment configuration includes requirements of a plurality of applications.

As further shown in FIG. 5, process 500 may include configuring, based on the environment configuration, the data environment, to generate a configured data environment, wherein the configured data environment includes a master container and, for each application of the plurality of applications, a servant container (block 520). For example, the data management platform (e.g., using processor 320, memory 330, storage component 340, input component 350, output component 360, communication interface 370, and/or the like) may configure, based on the environment configuration, the data environment, to generate a configured data environment, as described above. In some implementations, the configured data environment includes a master container and, for each application of the plurality of applications, a servant container.

As further shown in FIG. 5, process 500 may include deploying the configured data environment in the data structure (block 530). For example, the data management platform (e.g., using processor 320, memory 330, storage component 340, input component 350, output component 360, communication interface 370, and/or the like) may deploy the configured data environment in the data structure, as described above.

As further shown in FIG. 5, process 500 may include performing one or more tests on data stored in the configured data environment in the data structure to generate one or more test results based on performing the one or more tests on the data (block 540). For example, the data management platform (e.g., using processor 320, memory 330, storage component 340, input component 350, output component 360, communication interface 370, and/or the like) may perform one or more tests on data stored in the configured data environment in the data structure to generate one or more test results based on performing the one or more tests on the data, as described above.

As further shown in FIG. 5, process 500 may include updating, based on the one or more test results, the configured data environment, to generate an updated configured data environment, wherein the updated configured data environment meets the requirements of the plurality of applications (block 550). For example, the data management platform (e.g., using processor 320, memory 330, storage component 340, input component 350, output component 360, communication interface 370, and/or the like) may update, based on the one or more test results, the configured data environment, to generate an updated configured data environment, as described above. In some implementations, the updated configured data environment meets the requirements of the plurality of applications.

As further shown in FIG. 5, process 500 may include changing, based on the one or more test results, the configuration of the master container in the updated configured data environment (block 560). For example, the data management platform (e.g., using processor 320, memory 330, storage component 340, input component 350, output component 360, communication interface 370, and/or the like) may change, based on the one or more test results, the configuration of the master container in the updated configured data environment, as described above.

As further shown in FIG. 5, process 500 may include automatically changing, based on changing the configuration of the master container, configurations of the servant containers in the updated configured data environment (block 570). For example, the data management platform (e.g., using processor 320, memory 330, storage component 340, input component 350, output component 360, communication interface 370, and/or the like) may automatically change, based on changing the configuration of the master container, configurations of the servant containers in the updated configured data environment, as described above.

Process 500 may include additional implementations, such as any single implementation or any combination of implementations described below and/or in connection with one or more other processes described elsewhere herein.

In a first implementation, process 500 includes performing metadata validation on the data by determining: whether a metadata schema of a source which provided the data corresponds to a metadata schema of an application of the plurality of applications; whether the metadata schema of the source which provided the data corresponds to a metadata schema of the data in the configured data environment in the data structure; or whether a metadata schema of the data in the configured data environment in the data structure corresponds to the metadata schema of the application of the plurality of applications.

In a second implementation, alone or in combination with the first implementation, process 500 includes performing metadata validation on the data by determining: whether a metadata schema of a source which provided the data corresponds to a metadata schema of an application of the plurality of applications, whether the metadata schema of the source which provided the data corresponds to a metadata schema of the data in the configured data environment in the data structure, and whether a metadata schema of the data in the configured data environment in the data structure corresponds to the metadata schema of the application of the plurality of applications; and performing, based on the metadata validation, an action including at least one of: updating a metadata field in a metadata validation log; stopping the metadata validation; or updating the metadata validation log with a failure entry.

In a third implementation, alone or in combination with one or more of the first and second implementations, performing the one or more tests on the data stored in the configured data environment in the data structure includes performing a data-readiness test, wherein the data-readiness test includes at least one of: comparing characteristics of data records in the configured data environment in the data structure and characteristics of received data, comparing data records in the configured data environment in the data structure and corresponding data records of received data, identifying formatting issues in data records in the configured data environment in the data structure, identifying duplicate data records in the configured data environment in the data structure, or comparing data records in the configured data environment in the data structure and corresponding data records in the configured data environment in the data structure.

In a fourth implementation, alone or in combination with one or more of the first through third implementations, process 500 includes receiving a job request for the data structure, processing, using a machine learning model, the job request to determine a likelihood of the job request failing; and stopping, based on the likelihood satisfying a threshold, the job request.

In a fifth implementation, alone or in combination with one or more of the first through fourth implementations, process 500 includes receiving a job request for the data structure, performing the job request, monitoring, using a machine learning model, performance of the job request to determine a likelihood of the job request failing, and interrupting, based on the likelihood satisfying a threshold, the performance of the job request.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
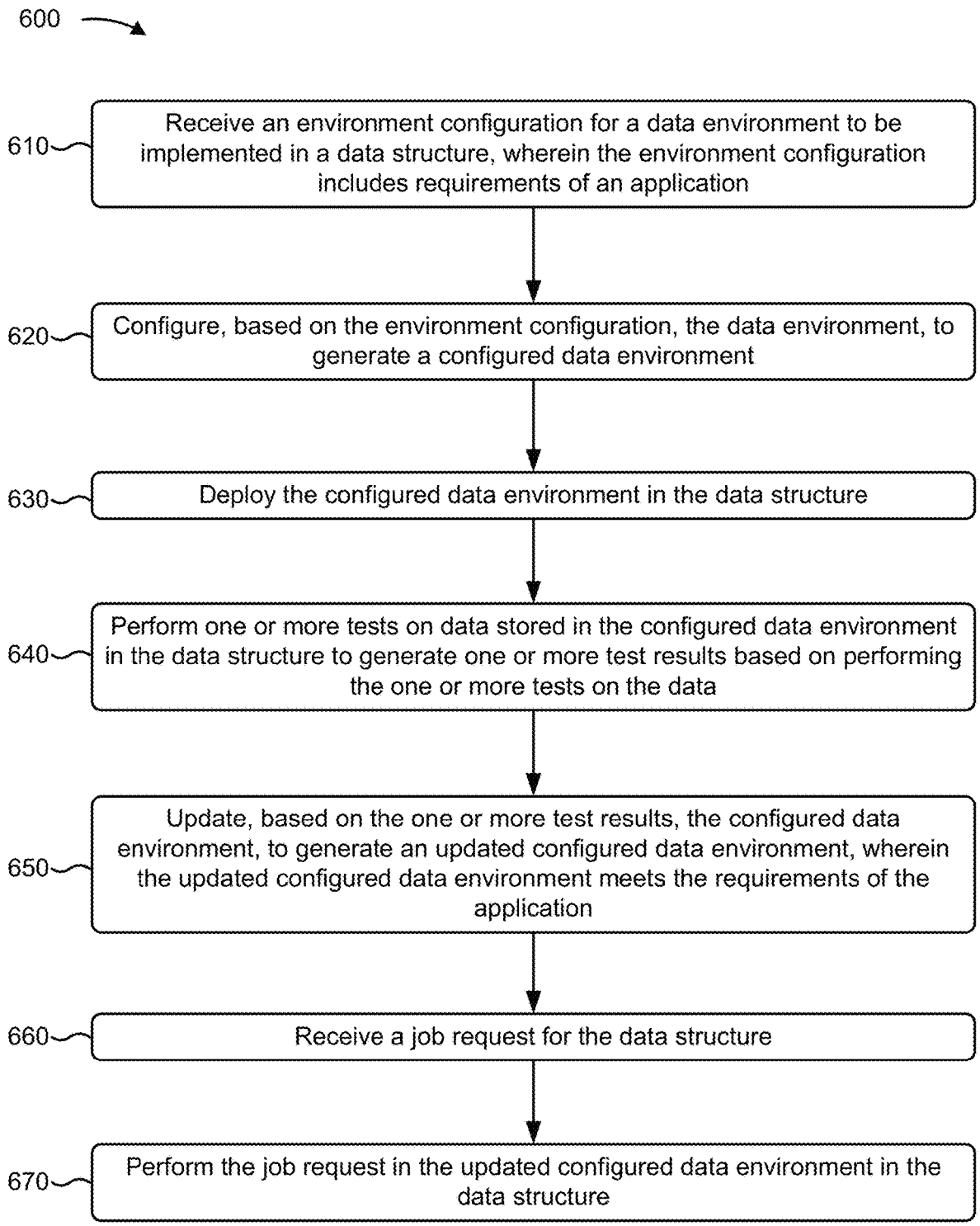

FIG. 6 is a flow chart of an example process 600 for configuring and testing a data environment in a data structure. In some implementations, one or more process blocks of FIG. 6 may be performed by a data management platform (e.g., data management platform 220). In some implementations, one or more process blocks of FIG. 6 may be performed by another device or a group of devices separate from or including the data management platform, such as such as a client device (e.g., client device 210), a computing resource (e.g., computing resource 225), and/or the like.

As shown in FIG. 6, process 600 may include receiving an environment configuration for a data environment to be implemented in a data structure, wherein the environment configuration includes requirements of an application (block 610). For example, the data management platform (e.g., using processor 320, memory 330, storage component 340, input component 350, output component 360, communication interface 370, and/or the like) may receive an environment configuration for a data environment to be implemented in a data structure, as described above. In some implementations, the environment configuration includes requirements of an application.

As further shown in FIG. 6, process 600 may include configuring, based on the environment configuration, the data environment, to generate a configured data environment (block 620). For example, the data management platform (e.g., using processor 320, memory 330, storage component 340, input component 350, output component 360, communication interface 370, and/or the like) may configure, based on the environment configuration, the data environment, to generate a configured data environment, as described above.

As further shown in FIG. 6, process 600 may include deploying the configured data environment in the data structure (block 630). For example, the data management platform (e.g., using processor 320, memory 330, storage component 340, input component 350, output component 360, communication interface 370, and/or the like) may deploy the configured data environment in the data structure, as described above.

As further shown in FIG. 6, process 600 may include performing one or more tests on data stored in the configured data environment in the data structure to generate one or more test results based on performing the one or more tests on the data (block 640). For example, the data management platform (e.g., using processor 320, memory 330, storage component 340, input component 350, output component 360, communication interface 370, and/or the like) may perform one or more tests on data stored in the configured data environment in the data structure to generate one or more test results based on performing the one or more tests on the data, as described above.

As further shown in FIG. 6, process 600 may include updating, based on the one or more test results, the configured data environment, to generate an updated configured data environment, wherein the updated configured data environment meets the requirements of the application (block 650). For example, the data management platform (e.g., using processor 320, memory 330, storage component 340, input component 350, output component 360, communication interface 370, and/or the like) may update, based on the one or more test results, the configured data environment, to generate an updated configured data environment, as described above. In some implementations, the updated configured data environment meets the requirements of the application.

As further shown in FIG. 6, process 600 may include receiving a job request for the data structure (block 660). For example, the data management platform (e.g., using processor 320, memory 330, storage component 340, input component 350, output component 360, communication interface 370, and/or the like) may receive a job request for the data structure, as described above.

As further shown in FIG. 6, process 600 may include performing the job request in the updated configured data environment in the data structure (block 670). For example, the data management platform (e.g., using processor 320, memory 330, storage component 340, input component 350, output component 360, communication interface 370, and/or the like) may perform the job request in the updated configured data environment in the data structure, as described above.

Process 600 may include additional implementations, such as any single implementation or any combination of implementations described below and/or in connection with one or more other processes described elsewhere herein.

In a first implementation, process 600 includes generating a master container in the configured data environment; and generating, based on the master container and for each application of a plurality of applications including the application, a servant container, wherein changing a configuration of the master container causes corresponding changes to configurations of the servant containers.

In a second implementation, alone or in combination with the first implementation, process 600 includes changing, based on the one or more test results, the configuration of the master container, and automatically changing, based on changing the configuration of the master container, the configurations of the servant containers.

In a third implementation, alone or in combination with one or more of the first and second implementations, process 600 includes performing metadata validation on the data by determining: whether a metadata schema of a source which provided the data corresponds to a metadata schema of the application, whether the metadata schema of the source which provided the data corresponds to a metadata schema of the data in the configured data environment in the data structure, or whether a metadata schema of the data in the configured data environment in the data structure corresponds to the metadata schema of the application.

In a fourth implementation, alone or in combination with one or more of the first through third implementations, process 600 includes performing metadata validation on the data by determining: whether a metadata schema of a source which provided the data corresponds to a metadata schema of the application; whether the metadata schema of the source which provided the data corresponds to a metadata schema of the data in the configured data environment in the data structure; and whether a metadata schema of the data in the configured data environment in the data structure corresponds to the metadata schema of the application; and performing, based on the metadata validation, an action including at least one of: updating a metadata field in a metadata validation log, stopping the metadata validation, or updating the metadata validation log with a failure entry.

In a fifth implementation, alone or in combination with one or more of the first through fourth implementations, performing the one or more tests on the data in the configured data environment in the data structure includes performing a data-readiness test, wherein the data-readiness test includes at least one of: comparing characteristics of data records in the configured data environment in the data structure and characteristics of received data; comparing data records in the configured data environment in the data structure and corresponding data records of received data; identifying formatting issues in data records in the configured data environment in the data structure; identifying duplicate data records in the configured data environment in the data structure; or comparing data records in the configured data environment in the data structure and corresponding data records in the configured data environment in the data structure.

In a sixth implementation, alone or in combination with one or more of the first through fifth implementations, process 600 includes processing, using a machine learning model, the job request to determine a likelihood of the job request failing and stopping, based on the likelihood satisfying a threshold, the job request.

In a seventh implementation, alone or in combination with one or more of the first through sixth implementations, process 600 includes monitoring, using a machine learning model, performance of the job request to determine a likelihood of the job request failing; and interrupting, based on the likelihood satisfying a threshold, the performance of the job request.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
  receiving, by a device, an environment configuration for a data environment to be implemented in a data structure,
    wherein the environment configuration includes requirements of an application;
  configuring, by the device and based on the environment configuration, the data environment, to generate a configured data environment,
    wherein the configured data environment includes a cluster with a metadata schema;
  instantiating, by the device, the configured data environment in the data structure;
  performing, by the device, one or more tests on data stored in the configured data environment in the data structure to generate one or more test results based on performing the one or more tests on the data;
  processing, by the device, the one or more test results to determine whether the metadata schema of the cluster corresponds to a metadata schema of the application;
  updating, by the device and based on determining that the metadata schema of the cluster does not correspond to the metadata schema of the application, the configured data environment, to generate an updated configured data environment,
    wherein the updated configured data environment meets the requirements of the application; and
  performing, by the device, metadata validation on the data stored in the updated configured data environment in the data structure,
    wherein performing the metadata validation includes:
      determining whether a metadata schema of a source which provided the data corresponds to the metadata schema of the application;
      determining whether the metadata schema of the source which provided the data corresponds to a metadata schema of the data in the updated configured data environment in the data structure; and
      determining whether the metadata schema of the data in the updated configured data environment in the data structure corresponds to the metadata schema of the application; and
  performing, by the device and based on the metadata validation, at least one of:
    updating a metadata field in a metadata validation log,
    stopping the metadata validation, or
    updating the metadata validation log with a failure entry.

2. The method of claim 1, wherein configuring the data environment to generate the configured data environment includes:
  generating, in the cluster, a master container in the configured data environment; and
  generating, based on the master container and for each application of a plurality of applications including the application, a servant container, wherein changing a configuration of the master container causes corresponding changes to configurations of the servant containers.

3. The method of claim 2, further comprising:
  changing, based on the one or more test results, the configuration of the master container; and
  automatically changing, based on changing the configuration of the master container, the configurations of the servant containers.

4. The method of claim 1, wherein performing the one or more tests on the data stored in the configured data environment in the data structure includes performing a data-readiness test, wherein the data-readiness test includes at least one of:
  comparing characteristics of data records in the configured data environment in the data structure and characteristics of received data;
  comparing data records in the configured data environment in the data structure and corresponding data records of received data;
  identifying formatting issues in data records in the configured data environment in the data structure;
  identifying duplicate data records in the configured data environment in the data structure; or
  comparing data records in the configured data environment in the data structure and corresponding data records in the configured data environment in the data structure.

5. The method of claim 1, further comprising:
  receiving a job request for the data structure;
  processing, using a machine learning model, the job request to determine a likelihood of the job request failing; and
  stopping, based on the likelihood satisfying a threshold, the job request.

6. The method of claim 1, further comprising:
  receiving a job request for the data structure;
  performing the job request;
  monitoring, using a machine learning model, performance of the job request to determine a likelihood of the job request failing; and
  interrupting, based on the likelihood satisfying a threshold, the performance of the job request.

7. A non-transitory computer-readable medium storing instructions, the instructions comprising:
  one or more instructions that, when executed by one or more processors, cause the one or more processors to:
    receive an environment configuration for a data environment to be implemented in a data structure,
      wherein the environment configuration includes requirements of a plurality of applications;
    configure, based on the environment configuration, the data environment, to generate a configured data environment,
      wherein the configured data environment includes a cluster with a metadata schema, and
      wherein the configured data environment includes, in the cluster, a master container and, for each application of the plurality of applications, a servant container;
    instantiate the configured data environment in the data structure;
    perform one or more tests on data stored in the configured data environment in the data structure to generate one or more test results based on performing the one or more tests on the data,
    process the one or more test results to determine whether the metadata schema of the cluster corresponds to a metadata schema of an application of the plurality of applications;
    update, based on determining that the metadata schema of the cluster does not correspond to the metadata schema of the application, the configured data environment, to generate an updated configured data environment,
wherein the updated configured data environment meets the requirements of the plurality of applications;
change, based on the one or more test results, the configuration of the master container in the updated configured data environment;
automatically change, based on changing the configuration of the master container, configurations of the servant container of each application, of the plurality of applications, in the updated configured data environment;
perform metadata validation on the data stored in the updated configured data environment; and
perform, based on the metadata validation, at least one of:
updating a metadata field in a metadata validation log,
stopping the metadata validation, or
updating the metadata validation log with a failure entry.

8. The non-transitory computer-readable medium of claim 7, wherein the one or more instructions, that cause the one or more processors to perform the one or more tests on the data stored in the configured data environment in the data structure, cause the one or more processors to:
perform metadata validation on the data by determining:
whether a metadata schema of a source which provided the data corresponds to the metadata schema of the application;
whether the metadata schema of the source which provided the data corresponds to a metadata schema of the data in the configured data environment in the data structure; or
whether a metadata schema of the data in the configured data environment in the data structure corresponds to the metadata schema of the application.

9. The non-transitory computer-readable medium of claim 7, wherein the one or more instructions, that cause the one or more processors to perform the one or more tests on the data stored in the configured data environment in the data structure, cause the one or more processors to:
perform metadata validation on the data by determining:
whether a metadata schema of a source which provided the data corresponds to the metadata schema of the application;
whether the metadata schema of the source which provided the data corresponds to a metadata schema of the data in the configured data environment in the data structure; and
whether a metadata schema of the data in the configured data environment in the data structure corresponds to the metadata schema of the application.

10. The non-transitory computer-readable medium of claim 7, wherein the one or more instructions, that cause the one or more processors to perform the one or more tests on the data stored in the configured data environment in the data structure, cause the one or more processors to perform a data-readiness test, wherein the data-readiness test includes at least one of:
comparing characteristics of data records in the configured data environment in the data structure and characteristics of received data;
compare data records in the configured data environment in the data structure and corresponding data records of received data;
identify formatting issues in data records in the configured data environment in the data structure;
identify duplicate data records in the configured data environment in the data structure; or
compare data records in the configured data environment in the data structure and corresponding data records in the configured data environment in the data structure.

11. The non-transitory computer-readable medium of claim 7, wherein the one or more instructions, when executed by the one or more processors, further cause the one or more processors to:
receive a job request for the data structure;
process, using a machine learning model, the job request to determine a likelihood of the job request failing; and
stop, based on the likelihood satisfying a threshold, the job request.

12. The non-transitory computer-readable medium of claim 7, wherein the one or more instructions, when executed by the one or more processors, further cause the one or more processors to:
receive a job request for the data structure;
perform the job request;
monitor, using a machine learning model, performance of the job request to determine a likelihood of the job request failing; and
interrupt, based on the likelihood satisfying a threshold, the performance of the job request.

13. A device, comprising:
one or more memories; and
one or more processors communicatively coupled to the one or more memories, configured to:
receive an environment configuration for a data environment to be implemented in a data structure,
wherein the environment configuration includes requirements of an application;
configure, based on the environment configuration, the data environment, to generate a configured data environment,
wherein the configured data environment includes a cluster with a metadata schema;
instantiate the configured data environment in the data structure;
perform one or more tests on data stored in the configured data environment in the data structure to generate one or more test results based on performing the one or more tests on the data;
process the one or more test results to determine whether the metadata schema of the cluster corresponds to a metadata schema of the application;
update, based on determining that the metadata schema of the cluster does not correspond to the metadata schema of the application, the configured data environment, to generate an updated configured data environment,
wherein the updated configured data environment meets the requirements of the application;
perform metadata validation on the data stored in the updated configured data environment;
perform, based on the metadata validation, at least one of:
updating a metadata field in a metadata validation log,
stopping the metadata validation, or
updating the metadata validation log with a failure entry;
receive a job request for the data structure; and perform the job request in the updated configured data environment in the data structure.

14. The device of claim 13, wherein the one or more processors, when configuring the data environment to generate the configured data environment, are further configured to:
   generate a master container in the configured data environment; and
   generate, based on the master container and for each application of a plurality of applications including the application, a servant container, wherein changing a configuration of the master container causes corresponding changes to configurations of the servant containers.

15. The device of claim 14, wherein the one or more processors are further configured to:
   change, based on the one or more test results, the configuration of the master container; and
   automatically change, based on changing the configuration of the master container, the configurations of the servant containers.

16. The device of claim 13, wherein the one or more processors, when performing the one or more tests on the data stored in the configured data environment in the data structure, are further configured to:
   perform metadata validation on the data by determining:
      whether a metadata schema of a source which provided the data corresponds to the metadata schema of the application;
      whether the metadata schema of the source which provided the data corresponds to a metadata schema of the data in the configured data environment in the data structure; or
      whether a metadata schema of the data in the configured data environment in the data structure corresponds to the metadata schema of the application.

17. The device of claim 13, wherein the one or more processors, when performing the one or more tests on the data in the configured data environment in the data structure, are further configured to perform a data-readiness test, wherein the data-readiness test includes at least one of:
   compare characteristics of data records in the configured data environment in the data structure and characteristics of received data;
   compare data records in the configured data environment in the data structure and corresponding data records of received data;
   identify formatting issues in data records in the configured data environment in the data structure;
   identify duplicate data records in the configured data environment in the data structure; or
   compare data records in the configured data environment in the data structure and corresponding data records in the configured data environment in the data structure.

18. The device of claim 13, wherein the one or more processors are further configured to:
   process, using a machine learning model, the job request to determine a likelihood of the job request failing; and
   stop, based on the likelihood satisfying a threshold, the job request.

19. The device of claim 13, wherein the one or more processors are further configured to:
   monitor, using a machine learning model, performance of the job request to determine a likelihood of the job request failing; and
   interrupt, based on the likelihood satisfying a threshold, the performance of the job request.

20. The device of claim 13, wherein configuring the data environment to generate the configured data environment includes:
   generating, in the cluster, a master container in the configured data environment; and
   generating, based on the master container and for each application of a plurality of applications including the application, a servant container, wherein changing a configuration of the master container causes corresponding changes to configurations of the servant containers.

* * * * *